March 27, 1945. F. W. HAMPSON 2,372,489

LEAK DETECTOR FOR ELECTROLYTE TANKS

Filed July 13, 1943

Fig. 1-a.

INVENTOR
FREDERICK W. HAMPSON
BY
Chapin & Neal
ATTORNEYS

Patented Mar. 27, 1945

2,372,489

UNITED STATES PATENT OFFICE 2,372,489

LEAK DETECTOR FOR ELECTROLYTE TANKS

Frederick W. Hampson, Holyoke, Mass., assignor to Plating Processes Corporation, Holyoke, Mass., a corporation of Massachusetts Application July 13, 1943, Serial No. 494,542

1 Claim. (Cl. 200—52)

This invention relates to a leak detector for tanks containing electrolyte or other liquids which are conductors of electricity. The device will be found particularly useful in connection with the tanks and vats of liquid commonly used in an electroplating plant. As is well known, some of these tanks contain electrolyte made of high cost materials and other tanks contain corrosive liquids, and it is desirable in both cases that an immediate warning be given of any leak in such tanks to prevent loss or other damage.

The principles of the invention may be employed in several different forms, some of which are illustrated in the accompanying drawings, in which Fig. 1 is a perspective view of an electroplating tank, the walls of which are non-conducting, showing the terminals of the leak detector applied thereto and a simple form of circuit for a warning signal;

Figure 1:
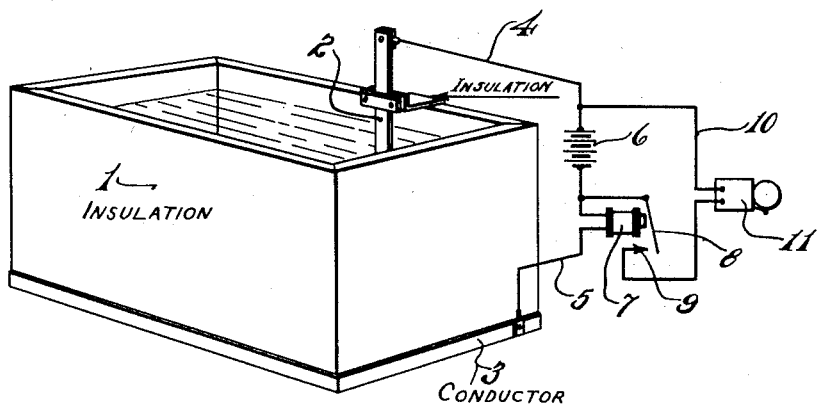
Fig. 1a is a fragmentary detail in perspective of one of the lower corners of the tank, looking at its underside.
Figure 1:
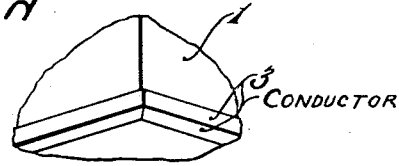

Referring to Fig. 1, the electroplating tank therein shown is indicated at 1 and its walls may be made of wood or any other non-conducting material. As in all cases hereinafter discussed the tank normally contains an electrolyte or some such good conducting liquid. An inside terminal for an electric circuit is mounted to extend downwardly within said tank as indicated at 2 so as to be in constant contact with the electrolyte in said tank. Secured around the outside lower corners of said tank, and preferably throughout its entire periphery and with a portion overlapping a part of the bottom of said tank (see Fig. 1a) is a conducting strip 3 which may be suitably made in the form of a self-adhesive tape composed of material which is a conductor of electricity.

A suitable form of relay operated alarm circuit is connected to the terminals 2 and 3 as shown. The circuit is indicated by the wires 4, 5, battery 6, relay magnet 7, armature 8, contact 9, circuit 10, and bell 11. In the operation of this device it will be understood that in the event that any of the electrolyte within the tank leaks through a crack or seam in the walls of said tank, it will seep down the outside of said wall to the lowest gravitating point of the tank and eventually come in contact with the conducting strip 3 at some point. Since the electrolyte is a good conductor of electricity the circuit will thereby be closed between the terminals 2 and 3 and an alarm warning given. This alarm will be given promptly before any serious damage can occur and will enable the operator to immediately take steps to repair the leak.

Figure 2:
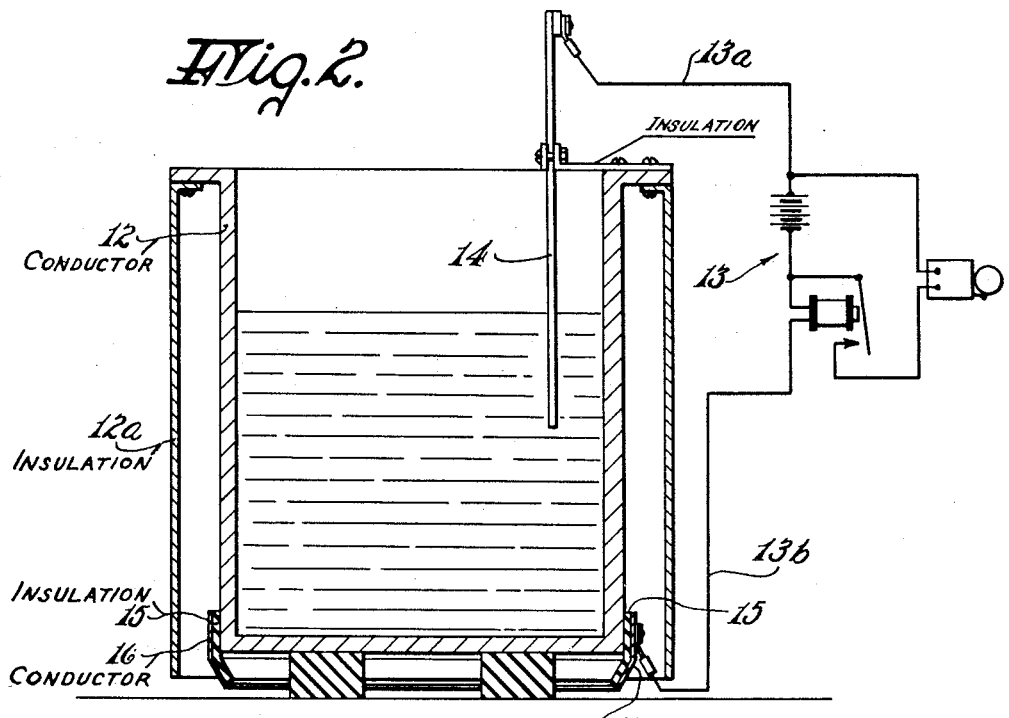
Fig. 2 is a cross sectional view of a tank, the walls of which are of steel or other conducting material, showing the detector device applied thereto.

Fig. 2 shows a tank with walls made of steel, iron, or some other conducting material 12. The electric circuit indicated generally at 13 is of the same general character as previously described. The inside terminal of the tank indicated at 14 is supported in a manner to be in constant contact with the electrolyte fluid within the tank. On the outside lower corners of the tank and around its periphery there is fastened first an insulating strip 15 which may be of adhesive tape and upon the outside of this insulating strip is fastened a conducting strip 16 which conducting strip is connected at one side 13a to the circuit 13 as shown. The terminal 14 is connected to the other side 13b of said circuit 13 as shown. In a similar manner as previously described any electrolyte or other conducting fluid which leaks out of this tank will eventually flow down to the lower corner thereof and bridge a circuit between the electrolyte inside the tank and conducting strip outside the tank for giving the alarm. In this type of tank it is desirable to provide an insulating apron or shield 12a hung in spaced relation to the outside conducting walls of the tank to prevent moisture or any conducting liquid from exterior sources coming into contact with said conducting wall 12 and accidentally bridging the circuit.

It will be understood that these tanks are made of various materials, sometimes with a lining and sometimes without a lining. The leak detector of the present device is for determining whether a leak exists through the wall which confines the liquid. This wall may be either the lining or the wall of the tank itself. It will also be noted that one of the terminals of the electric circuit is in constant contact with the electrolyte or other conducting fluid within the tank and that the other terminal or some connected portion thereof is always close to the lowest gravitating point for the liquid in the tank whereby upon leakage through the confining wall of the tank the electrolyte will flow down and come in contact with said outside terminal.

I claim:

In a tank having an electrolyte confining wall, a leak detector for said wall comprising a terminal of an electric circuit in constant contact with the electrolyte inside the wall, a second terminal of said electric circuit comprising a conducting strip of relatively narrow adhesive tape positioned at the lowermost outside corner of said tank so as to overlap only a narrow area of the wall of the tank adjacent said lower corner said tape being normally insulated from the electrolyte within said tank but arranged whereby electrolyte leaking through said wall will flow by gravity into contact with said conducting tape and thereby close the electric circuit.

FREDERICK W. HAMPSON.